May 27, 1930.  W. E. HUMPHREY  1,760,411
BEAD CUTTING MECHANISM
Filed Aug. 7, 1926   3 Sheets-Sheet 1

Inventor
Walter E. Humphrey

By 
Attorney.

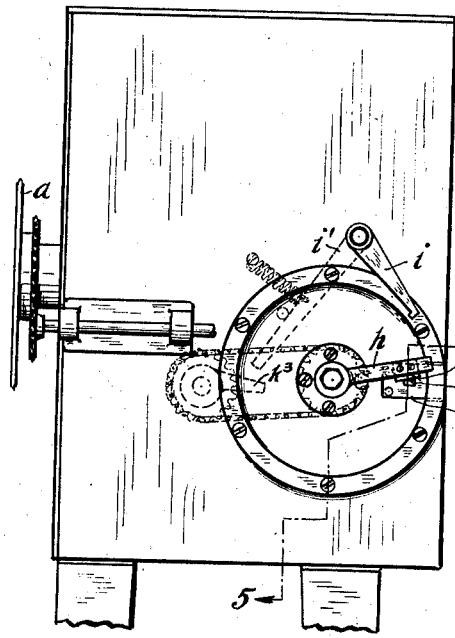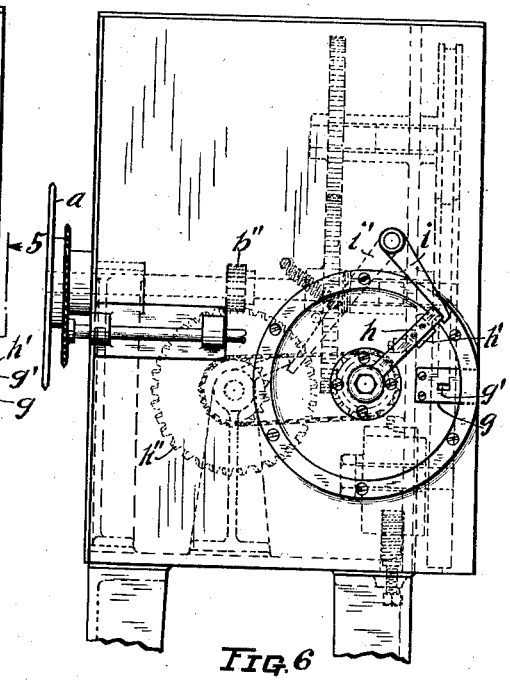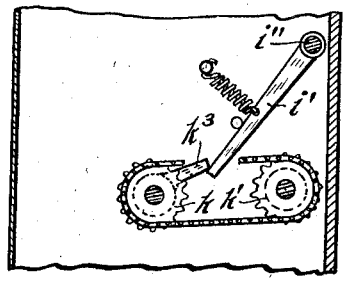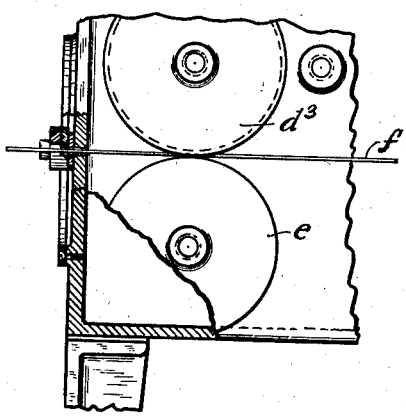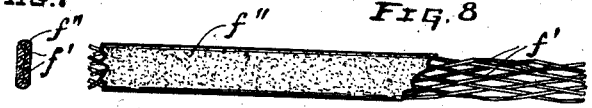

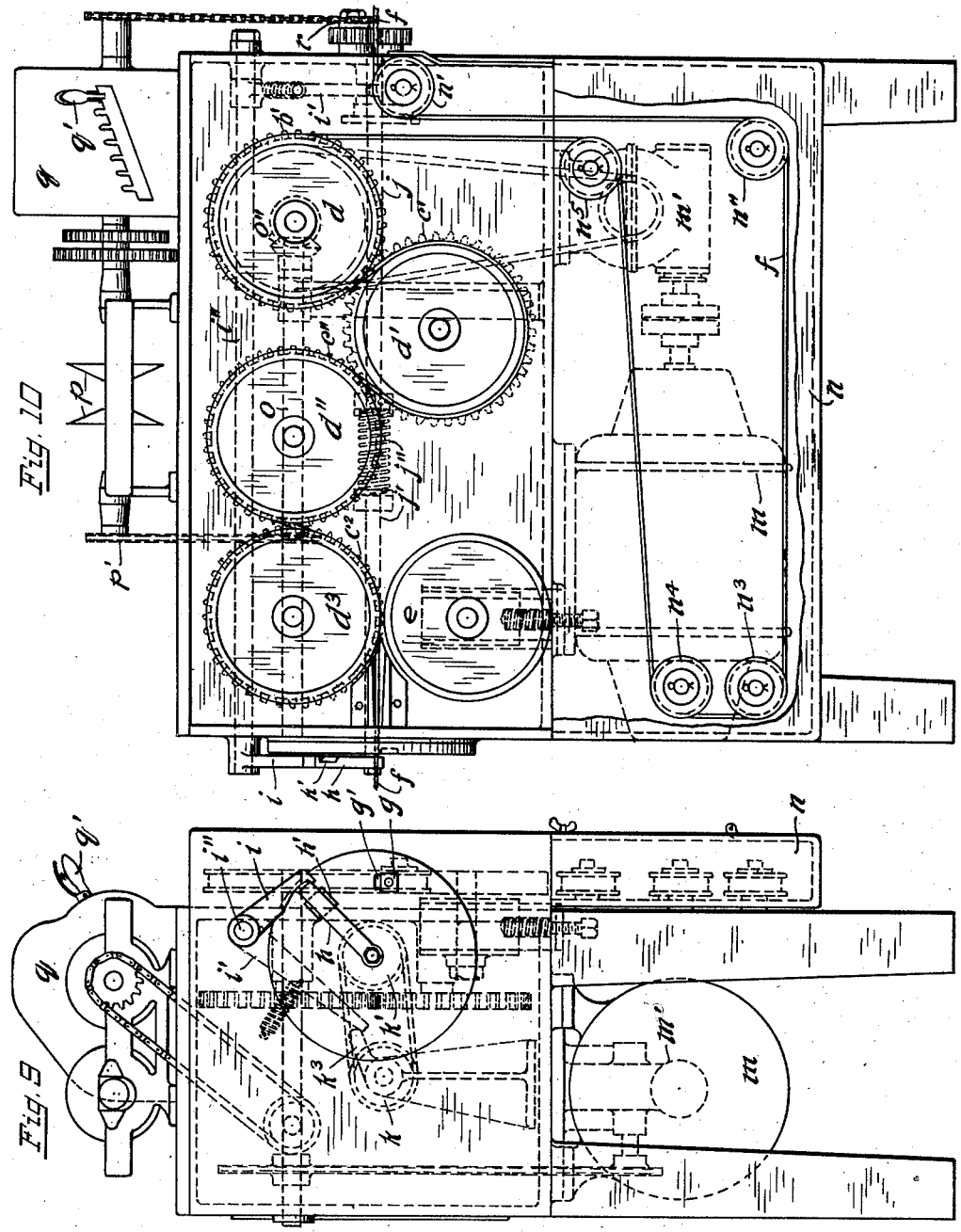

Patented May 27, 1930

1,760,411

UNITED STATES PATENT OFFICE

WALTER E. HUMPHREY, OF KENT, OHIO, ASSIGNOR TO THE MASON TIRE & RUBBER CORPORATION, OF KENT, OHIO, A CORPORATION OF DELAWARE

BEAD-CUTTING MECHANISM

Application filed August 7, 1926. Serial No. 127,959.

My invention relates to improvements in bead cutting mechanism, and has for its object the provision of means for accurately and rapidly cutting lengths of bead-forming material from the continuous strip of fabricated material.

The particular bead-forming material which I shall assume is operated upon by my improved machine, comprises a band of relatively stiff interwoven wires, with which there is incorporated an enclosing body of raw rubber. This fabricated material obviously presents certain difficulties in handling and cutting the same, by reason of its inherent tendency to curl, as well as the liability of disrupting or displacing the rubber covering. Accordingly, it has been by instant purpose to devise suitable mechanism which shall effectively, rapidly and cheaply cut the material into such lengths as may be required for use.

This mechanism essentially comprises a series of cooperating rolls over and between which the fabricated bead-forming material is drawn at a predetermined rate. In association therewith, I have provided an intermittently operated cutter, preferably having a retarded spring-actuated blow, which cutter operates upon the material at such intervals as to separate it into the desired lengths, without interrupting the feed or movement of the mechanism. The details of the particular mechanism embodying my invention, and its mode of operation, may best be explained in connection with the accompanying drawings, wherein:

Fig. 3 is a view thereof in end elevation;

Fig. 4 is another view in end elevation, but showing the cutter in its detained position, together with the operating mechanism in dotted lines;

Fig. 5 is a fragmentary view, partially in irregular section on line 5—5, Fig. 3;

Fig. 6 is another fragmentary section on line 6—6, Fig. 2;

Fig. 7 is a cross sectional view, Fig. 8 a plan view, partially broken away, showing the type of bead-forming material with which the mechanism is adapted to deal.

Fig. 9 is an end view of my bead cutting mechanism equipped with adjusting means and a self-contained electric motor, and Fig. 10 is another view thereof in side elevation.

Throughout the several figures of the drawings I have employed the same character of reference to indicate similar parts.

This machine desirably is driven from the gear $a$ meshing with the prime mover (not shown) to actuate the shaft $b$, having the main gear $b'$ of a train of gears, and the spiral gear $b''$, mounted directly thereon. Externally of the casing $c$ there is provided a drum $d$ having a grooved periphery also mounted upon and rotated by shaft $b$. Additional coacting drums $d'$, $d''$ and $d^3$ of similar diameters and grooved peripheries are mounted in line with the drum $d$, while a coacting roller or drum $e$ is forced against said drum $d^3$ by means of the spring $e'$ which is tensioned against the sliding bearing $e''$.

Over and between these drums, respectively, there is led the continuous length of fabricated bead-forming material, generally designated by $f$, and shown in Figs. 7 and 8, to comprise a plurality of stiff interwoven, braided wires $f'$ and enclosing, permeating body of raw rubber $f''$. Depending upon the size of the bead, these wires may be increased in number to give additional strength and body; the machines now built successfully operating upon and cutting a bead-forming member comprising some seventeen interwoven wires.

Figure 2:
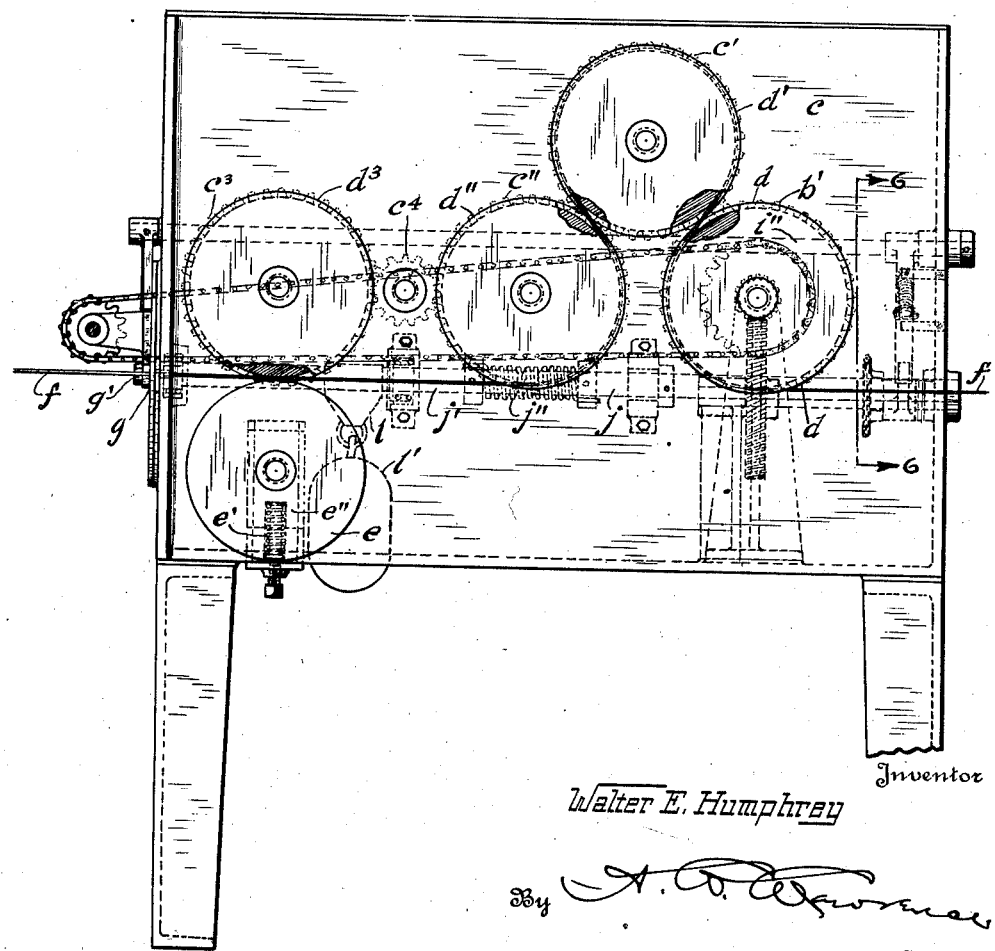
Fig. 2 is a view thereof, also broken away, in side elevation.
Figure 2:

Referring particularly to Fig. 2, it will be seen that the bead-forming material enters the groove of drum $d$, loops about drums $d'$ and $d''$, and passes between the drums $d^3$ and $e$. These drums are directly or indirectly driven by the train of gears $c'$, $c''$, $c^3$ and $c^4$, actuated by the main gear $b'$. Thus the bead-forming material is fed through the opening $g'$ in the cutter-plate $g$, rapidly and continuously in order to cut the same automatically of the uniform and desired length.

Attention is drawn to Fig. 4, showing the rotated cutter-arm $h$ momentarily held by the detent $i$. This cutter-arm carries the hardened steel blade $h'$ which has a shearing action with respect to the cutter-plate $g$, as indicated in Figs. 3 and 5, when released from the detent.

Figure 1:
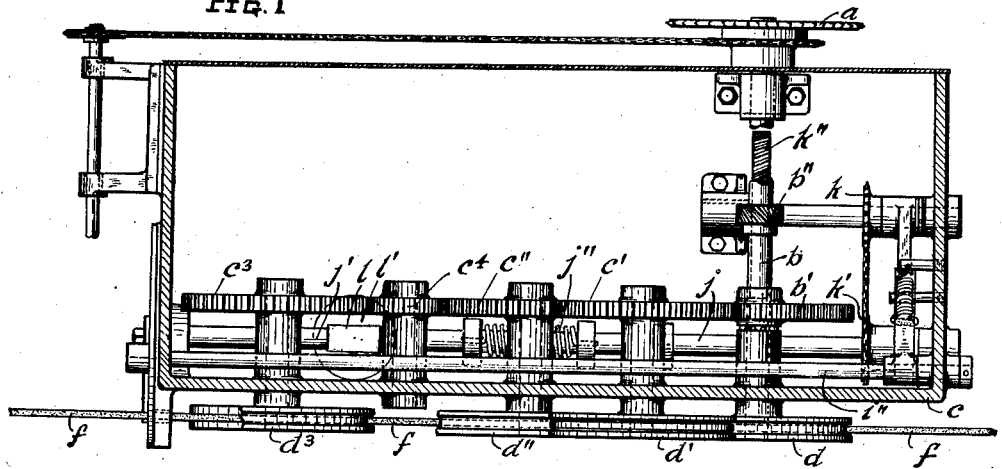
Figure 1 is a view, principally in plan view, but partially in section and broken away, illustrating said mechanism.

The actuating means for the cutter-arm comprise two driven shaft members $j$, $j'$ (Fig. 1) operatively connected by a coiled spring $j''$. This normally imparts rotary motion to the cutter-arm, actuated by the chain-connected gears $k$, $k'$ and $k''$; the latter, in turn, being actuated at reduced speed by the spiral gear $b''$. An arm $k^3$, as best shown in Figs. 3 and 6, is rotated with gear $k$, contacting once during each revolution with the end of the spring-retracted lever $i'$ mounted on the end of shaft $i''$ opposite the detent $i$. Thus, the hooked end of said detent normally is held in position temporarily to engage the end of the cutter-arm as it is rotated by its spring-connected shaft in a clockwise direction.

Although the cutter-arm is thus detained once during each revolution, the farther end of its gear-driven shaft $j'$ is continuously rotated and thereby places a strong tension upon the spring $j''$, until the cutter-arm is suddenly released from its detent. Whereupon, the force of the spring is exerted to effect an almost instantaneous blow of the cutter against the advanced length of bead-forming material $f$ at the cutter-plate $g$, thereby automatically severing a predetermined length thereof. This does not in the least interrupt the feeding action of the machine in its continuous operation.

As a means of checking the suddenly actuated cutter-arm $h$ and its shaft $j$, following the cutting operation, I preferably provide a brake device or dampener, comprising the wide leather band $l$ extending over the shaft $j$ and held closely in engagement therewith by means of the weight $l'$. This prevents the overthrow of the cutter-arm and shaft section and saves the spring.

From the foregoing it will be appreciated that my improved mechanism is well adapted for automatically measuring and cutting accurately into the desired lengths this somewhat difficult bead-forming material, without waste or delay.

While the mechanism above described is adapted to cut the bead-forming material into predetermined lengths, frequently it is desirable that a wide measure of adaptability shall be afforded, with the facilities for cutting beads of different lengths, either to afford more plies therein, or produce beads of larger or smaller diameter.

Moreover, when the bead-forming material is handled directly from the "tuber", which applies and embeds the wires in a ribbon of heated rubber, it is highly desirable more or less completely to cool and somewhat toughen the rubber before it is introduced to the bead-forming mechanism. Accordingly, I have applied certain improvements to the type of mechanism already described, which will accomplish these results; the same being shown in Figs. 9 and 10 of the drawings.

This machine is self-contained, in that it is provided with its own electric motor $m$ having a driving connection through the reducing gear $m'$. The feeding and cutting mechanism of this machine are identical with the one already described, and similar reference letters thereon obviate any detailed description in this connection. However, a cooling tank, or water bath $n$ is provided for initially cooling the bead-forming material as it comes from the tuber and is directed over the successive rollers $n'$, $n''$, $n^3$, $n^4$ and $n^5$ into and out of the cooling tank to the similar staggered arrangement of grooved drums $d$, $d'$, $d''$ and $d^3$. These effect a continuous feed of the bead-cutting material through the cutter-plate $g$.

In order to vary the lengths of bead-forming material to be cut by this mechanism, it is necessary to provide adjustable timing mechanism between the feeder and the cutter portions of the machine. This is afforded by the variable speed drive from the bevelled gears $o'$ and shaft $o$, connected to the sprocket $p'$ of the Reece variable speed transmission $p$, which in turn is connected with the seven-speed adjustable friction gear $q$, controlled by the lever $q'$. Thus the rate of the timed shaft $r$, connected thereto by the chain drive, is made widely adjustable in order to permit the cutting of different lengths of the bead-forming material automatically, as explained above.

These added improvements, accordingly, afford self-contained means for cooling, and thereby adapting the freshly made bead-forming material to be handled, in addition to the possibility of cutting said material to such lengths as may be desired for immediately fabricating a multiple-ply annular bead therefrom.

Having now described the preferred embodiment of my invention and its mode of operation, I claim as new and desire to secure by Letters Patent, the following:

1. In a bead-cutting mechanism, the combination with means for uniformly advancing the bead-forming material, of a rotated cutter member therefor, actuating means including an interposed spring reacting against the cutter member, a detent for said member, and means timed with the bead advancing means for retracting the detent and releasing the cutter member, substantially as set forth.

2. In a bead-cutting mechanism, the combination with means for uniformly advancing the bead-forming material, of a rotated cutter member, a driving shaft therefor, an interposed tensioning spring, and means timed with the bead advancing means for alternately tensioning the spring and releasing it to sever a predetermined length of said bead-forming material, substantially as set forth.

3. In apparatus of the class described, the combination with advancing means, of a rotated cutter, means for actuating said cutter including an interposed tensioning spring, and a timed detent for the cutter adapted to release the same when the spring is tensioned for its cutting blow, substantially as set forth.

4. In a bead-cutting mechanism, the combination with means for partially cooling the bead-forming material, of associated means for advancing said material to a cutter device, a traveling cutter member, actuating means therefor including a spring reacting against said member, a detent therefor, and timed means for retracting the detent and releasing said cutter member, substantially as set forth.

5. In a bead-cutting mechanism, the combination with means for advancing the bead-forming material approximately at a uniform rate, of a moving cutter member therefor, actuating means including a spring reacting against the cutter member, a temporarily-acting detent therefor, means timed with the bead advancing means for retracting the detent and releasing said cutter member, and speed-varying means for adjusting the rate of said timed means, substantially as set forth.

6. In a bead-cutting mechanism, the combination with means for continuously advancing the bead-forming material of a rotated cutter member, a driving shaft therefor, a tensioning spring connected to actuate the cutter and adjustable means timed with the bead advancing means for alternately tensioning the spring and releasing it with said cutter to sever definite lengths of the bead-forming material, substantially as set forth.

7. In a bead-cutting mechanism, the combination with means for continuously feeding the bead-forming material, of an intermittently actuated cutter device, a tensioning spring reacting against the cutter, a detent momentarily engaging the cutter against spring tension, and adjustable means variably timed with the bead feeding means for retracting the detent and releasing the cutter, substantially as set forth.

8. In a bead-cutting mechanism, the combination with a rotatable cutter, of means for actuating the same including a spring axially positioned with respect to the rotatable cutter, a detent normally restraining said cutter against the tension of its axial spring, means for advancing the bead-forming material, and automatic means timed with the latter for retracting the detent and releasing the cutter, substantially as set forth.

9. In a bead-cutting mechanism, the combination with a rotatable cutter, of means for actuating the same including a spring positioned axially with respect to said rotatable cutter, a detent normally restraining said cutter against the tension of its axially disposed spring, means for advancing the bead-forming material to the cutter at variable rates of speed, and automatic means timed therewith for retracting the detent and releasing the cutter, whereby lengths of the bead-forming material may be indefinitely varied, substantially as set forth.

10. In a bead-cutting mechanism, the combination with means for continuously feeding the bead-forming material, of means for indefinitely varying the rate thereof as required, a coacting rotatable cutter, an axially positioned tensioning spring reacting against the same, a detent momentarily engaging the cutter against the tension of said spring, and timing means interposed between the feed and detent for retracting the latter at indefinitely variable intervals, substantially as set forth.

11. In a bead-cutting mechanism, the combination with means for continuously feeding the bead-forming material, of a cooling appliance for said material, means for indefinitely varying the rate of feed, a rotatable cutter member, an axially positioned spring and driven shaft therefor, a detent for said cutter, and timing means interposed between the feed and detent for retracting the latter at intervals, whereby the cutter may sever indefinitely variable lengths of the material, as required, substantially as set forth.

In testimony whereof I do now affix my signature.

WALTER E. HUMPHREY.